United States Patent
Shiina et al.

(10) Patent No.: US 10,644,387 B2
(45) Date of Patent: May 5, 2020

(54) ANTENNA DEVICE

(71) Applicant: SUBARU CORPORATION, Tokyo (JP)

(72) Inventors: Takahito Shiina, Tokyo (JP); Shunsuke Tezuka, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/128,153

(22) Filed: Sep. 11, 2018

(65) Prior Publication Data

US 2019/0103664 A1 Apr. 4, 2019

(30) Foreign Application Priority Data

Oct. 2, 2017 (JP) ................. 2017-192372

(51) Int. Cl.
*H01Q 1/32* (2006.01)
*H01Q 1/42* (2006.01)
*H01Q 1/52* (2006.01)
*H01Q 1/12* (2006.01)
*H01Q 3/04* (2006.01)
*G01S 13/931* (2020.01)

(52) U.S. Cl.
CPC ......... *H01Q 1/3275* (2013.01); *H01Q 1/1264* (2013.01); *H01Q 1/42* (2013.01); *H01Q 1/52* (2013.01); *H01Q 3/04* (2013.01); *G01S 13/931* (2013.01); *G01S 2013/93273* (2020.01)

(58) Field of Classification Search
CPC ................. H01Q 1/3275; H01Q 1/42
USPC ......................................... 343/713
See application file for complete search history.

(56) References Cited

U.S. PATENT DOCUMENTS

| 8,508,419 B2* | 8/2013 | Petrucci ................. H01Q 21/28 343/711 |
| 9,340,119 B2* | 5/2016 | Chen ....................... B60L 58/12 |
| 2010/0013724 A1 | 1/2010 | Ohshima et al. |
| 2011/0298678 A1* | 12/2011 | Petrucci ............... H01Q 1/3275 343/713 |
| 2012/0098717 A1* | 4/2012 | Petrucci ............... H01Q 1/3275 343/713 |
| 2013/0249748 A1* | 9/2013 | Togura ..................... H01Q 1/22 343/713 |
| 2014/0347231 A1* | 11/2014 | Kerselaers ........... H01Q 13/106 343/713 |

FOREIGN PATENT DOCUMENTS

JP 5237617 B2 7/2013

* cited by examiner

*Primary Examiner* — Huedung X Mancuso
(74) *Attorney, Agent, or Firm* — McDermott Will & Emery LLP

(57) ABSTRACT

An antenna device includes an antenna element and a radio wave characteristic switching controller. The antenna element is fitted on a vehicle. The antenna element transmits and receives a radio wave. The radio wave characteristic switching controller changes, in case of an interruption of communication via the antenna element, a characteristic of the radio wave to be transmitted and received by the antenna element, until restoration of communication.

12 Claims, 6 Drawing Sheets

ANTENNA DEVICE

CROSS-REFERENCE TO RELATED APPLICATIONS

The present application claims priority from Japanese Patent Application No. 2017-192372 filed on Oct. 2, 2017, the entire contents of which are hereby incorporated by reference.

BACKGROUND

The technology relates to an antenna device, and specifically to an antenna device fitted on a vehicle including a rooftop structure such as roof rails.

Japanese Patent (JP-B) No. 5237617 describes an antenna device fitted on a roof of a vehicle. The antenna device according to JP-B No. 5237617 includes an antenna and an antenna case that accommodates the antenna. The antenna case protrudes beyond the roof of the vehicle by a small height, e.g., about 70 mm or less. The antenna case has a streamlined shape, with its height decreasing as is closer to a tip, and with its side face narrowing inwardly as is closer to the tip. Thus, the antenna device prevents the antenna from being damaged at the time of garaging or car washing.

SUMMARY

An aspect of the technology provides an antenna device that includes an antenna element and a radio wave characteristic switching controller. The antenna element is fitted on a vehicle. The antenna element is configured to transmit and receive a radio wave. The radio wave characteristic switching controller is configured to change, in case of an interruption of communication via the antenna element, a characteristic of the radio wave to be transmitted and received by the antenna element, until restoration of communication.

An aspect of the technology provides an antenna device that includes an antenna element and circuitry. The antenna element is fitted on a vehicle. The antenna element is configured to transmit and receive a radio wave. The circuitry is configured to change, in case of an interruption of communication via the antenna element, a characteristic of the radio wave to be transmitted and received by the antenna element, until restoration of communication.

DETAILED DESCRIPTION

In the following, some preferred implementations of the technology are described in detail with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

Some vehicles are provided with a rooftop structure such as roof rails. If the antenna device according to JP-B No. 5237617 is attached to a roof of such a vehicle, the roof rails may cause interference of radio waves to be transmitted and received by the antenna device. Hence, there arises a concern that omnidirectional communication by the antenna device is hindered.

It is desirable to provide an antenna device that makes it possible to suppress radio wave interference caused by a rooftop structure such as roof rails, allowing for omnidirectional communication.

(First Implementation)

Figure 1:
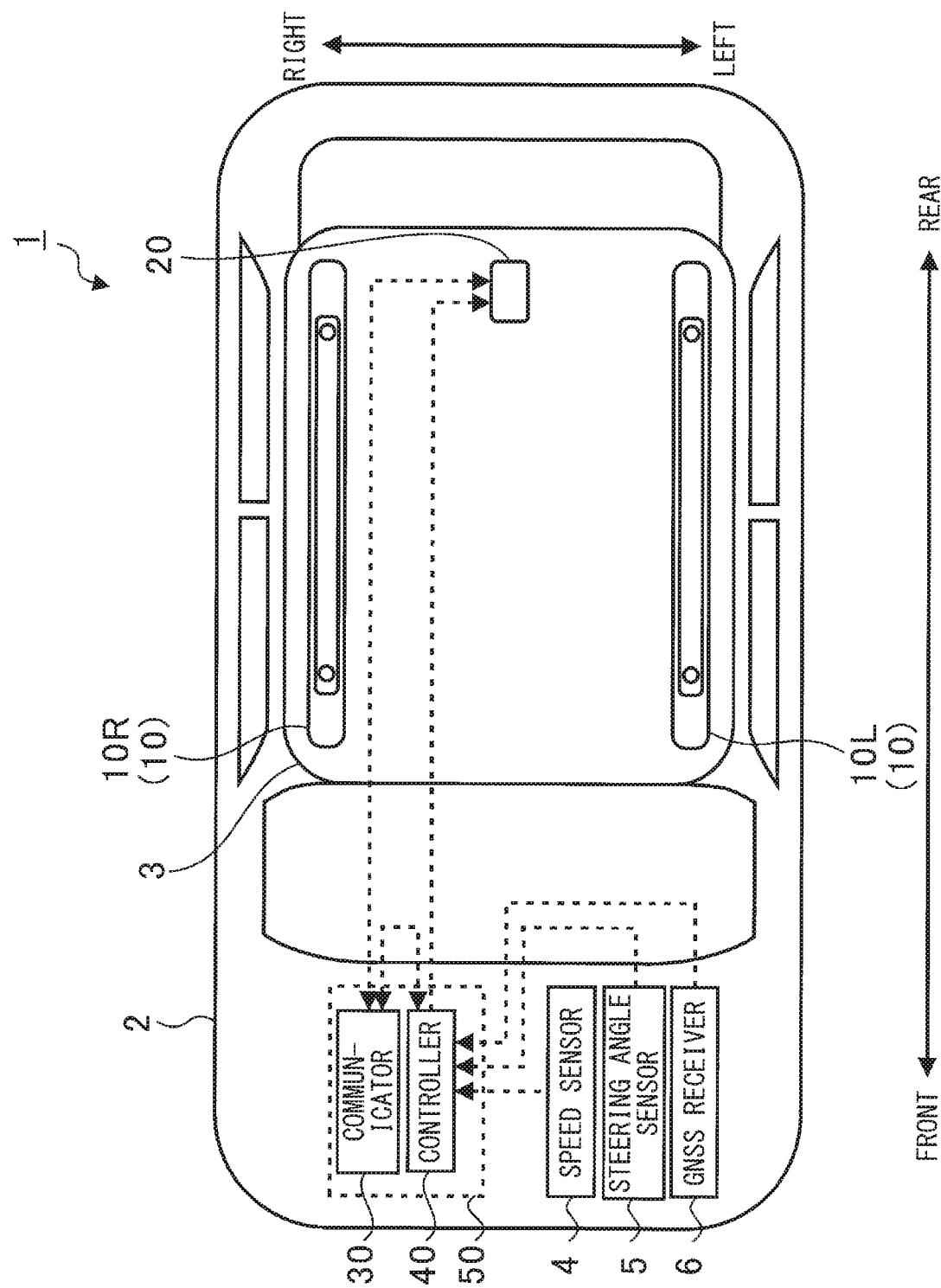
FIG. 1 is a schematic plan view of a configuration of a vehicle on which an antenna device according to a first implementation is fitted.

FIG. 1 is a schematic plan view of a configuration of a vehicle 2 on which an antenna device 1 according to a first implementation is fitted. In FIG. 1, flows of signals are denoted by broken line arrows. In the following, with the vehicle 2 serving as a reference, a traveling direction and a reversing direction are respectively assumed to be a front direction and a rear direction. A left direction with respect to the traveling direction is assumed to be a left direction, while a right direction with respect to the traveling direction is assumed to be a right direction.

The vehicle 2 may include a roof 3. The roof 3 may be provided with two roof rails 10L and 10R. The roof rails 10L and 10R may extend in a front-rear direction of the vehicle 2, in spaced relation in a vehicle widthwise direction. The roof rail 10L may be disposed near a left side end on the roof 3, while the roof rail 10R may be disposed near a right side end on the roof 3. The roof rails 10L and 10R are denoted as roof rails 10, unless distinction between them is made. In one implementation, the roof rails 10 may serve as a "rooftop structure".

The antenna device 1 may include a main body 20, a communicator 30, and a controller 40. The main body 20 may be disposed between the roof rail 10L and the roof rail 10R, near a rear midpoint of the vehicle 2, on the roof 3. The communicator 30 and the controller 40 may constitute, for example, an inter-vehicle communication unit 50 that is mounted on the vehicle 2.

The vehicle 2 may include a speed sensor 4, a steering angle sensor 5, and a global navigation satellite system (GNSS) receiver 6. The speed sensor 4 may detect a vehicle speed of the vehicle 2. Speed information that indicates the vehicle speed may be transmitted to the controller 40. The steering angle sensor 5 may detect a steering angle of a steering wheel. Steering angle information that indicates the steering angle may be transmitted to the controller 40. The GNSS receiver 6 may receive radio waves to be transmitted from a plurality of satellites. The GNSS receiver 6 may acquire, on the basis of the radio waves received, positional information that indicates a position of the vehicle 2, i.e., latitude and longitude of the vehicle 2. The positional information of the vehicle 2 may be transmitted to the controller 40.

Figure 2:
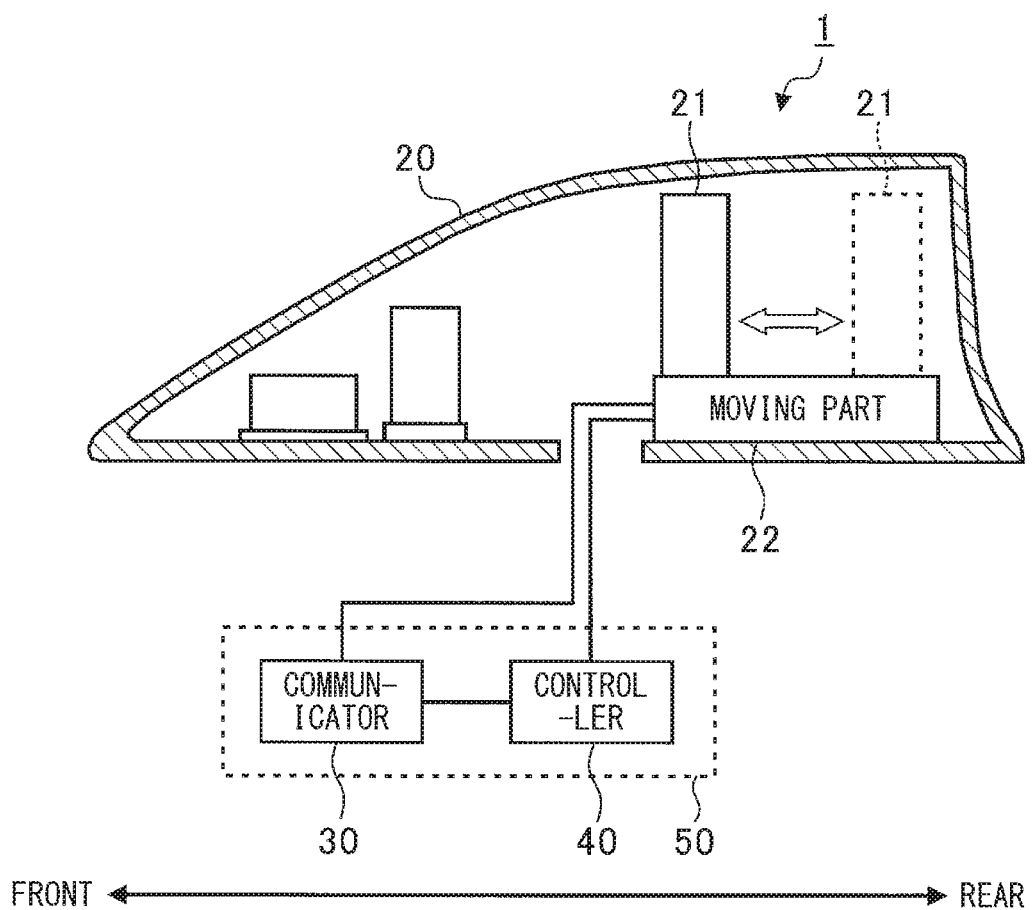
FIG. 2 schematically illustrates a configuration of the antenna device.

FIG. 2 is a schematic diagram of a configuration of the antenna device 1. The main body 20 may include a case having a cavity in its inside. The main body 20 may have a width that is small relative to a length in the front-rear direction. The width of the main body 20 may gradually decrease as goes toward an upper tip and a front tip. The main body 20 has a heightwise dimension smaller than a heightwise dimension of the roof rails 10. The heightwise direction of the main body 20 may gradually decrease as goes toward the front tip. In other words, the main body 20 may have a streamlined shark-fin shape.

The main body 20 may accommodate an antenna element 21 and a moving part 22 in its inside. The antenna element 21 may be coupled to the moving part 22. The antenna element 21 may upstand on the moving part 22. The antenna element 21 may be electrically coupled to the communicator 30 and to the controller 40 through the moving part 22. The antenna element 21 may perform transmission and reception of radio waves.

The communicator 30 may receive a signal carried by a radio wave received by the antenna element 21, and output a signal to the antenna element 21 to allow the antenna element 21 to transmit a radio wave. In this way, the communicator 30 may perform communication with surrounding vehicles, e.g., a preceding vehicle.

The moving part 22 may move the antenna element 21 along a plane parallel to the roof 3. In one specific but non-limiting example, the moving part 22 may move the antenna element 21 in the front-rear direction of the vehicle 2.

Figure 3:
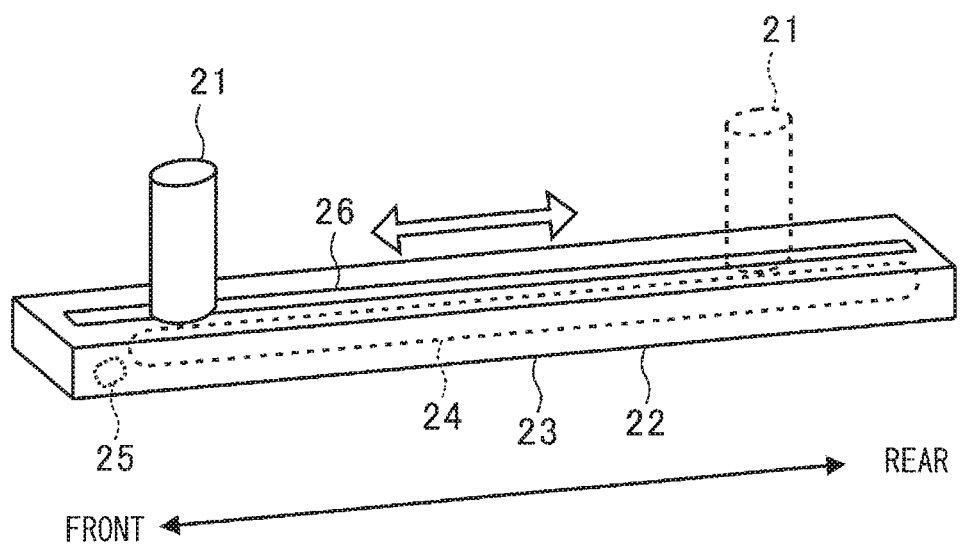
FIG. 3 is a perspective view of an example of a configuration of a moving part.

FIG. 3 is a perspective view of an example of a configuration of the moving part 22. The moving part 22 may include a casing 23, a belt 24, and a motor 25. The casing 23 may be shaped as a rectangular parallelepiped having a cavity in its inside. The casing 23 may be fixed to a bottom surface inside the main body 20. The casing 23 may be disposed with its longitudinal direction being parallel to the front-rear direction of the vehicle 2. The casing 23 may have a slit 26 in its upper surface. The slit 26 may be elongated in the longitudinal direction of the casing 23. The casing 23 may accommodate the belt 24 and the motor 25 in its inside. The belt 24 may include a strip-shaped member both ends of which are joined together to form a loop. The belt 24 may be disposed along the slit 26. The motor 25 may operate in response to a signal from the controller 40, to cause rotation of the belt 24.

At least a portion of a bottom of the antenna element 21 may be inserted in the slit 26 and fixed to the belt 24. This allows the antenna element 21 to be movable along the slit 26 in accordance with the rotation of the belt 24. When disposed forward, the antenna element 21 may assume a position as denoted by a solid line in FIG. 3. When disposed rearward, the antenna element 21 may assume a position as denoted by a broken line in FIG. 3.

The controller 40 may be electrically coupled to the moving part 22 and the communicator 30. The controller 40 may include a semiconductor integrated circuit including, for example, a central processing unit (CPU), a read only memory (ROM) that stores, for example, programs, and a random access memory (RAM) that serves as a work area.

The controller 40 may drive the moving part 22, causing the antenna element 21 to move. In one specific but non-limiting example, the controller 40 may drive the motor 25 of the moving part 22, causing the rotation of the belt 24. The rotation of the belt 24 causes the antenna element 21 to move in the front-rear direction of the vehicle 2.

Some of radio waves emitted from the antenna element 21 fall on the roof rails 10. The radio wave that has fallen on the roof rails 10 is refracted by and reflected from the roof rails 10. The refracted and reflected radio wave interferes with the radio wave that travels straight from the antenna element 21. Action of phase shift by about a half wavelength between the refracted and reflected radio wave and the radio wave that travels straight causes the radio waves to cancel each other out. This causes a decrease in electric field strength and a decrease in gain of the radio wave, in a direction in which the action of the phase shift caused the radio waves to cancel each other out, within a horizontal direction with respect to the vehicle 2. As a result, there arises possibility that the radio wave may fail to reach a vehicle in an azimuth in which the electric field strength and the gain of the radio wave decrease. The failure of the radio wave in reaching the vehicle is followed by an interruption of communication with the relevant vehicle.

Figure 4:
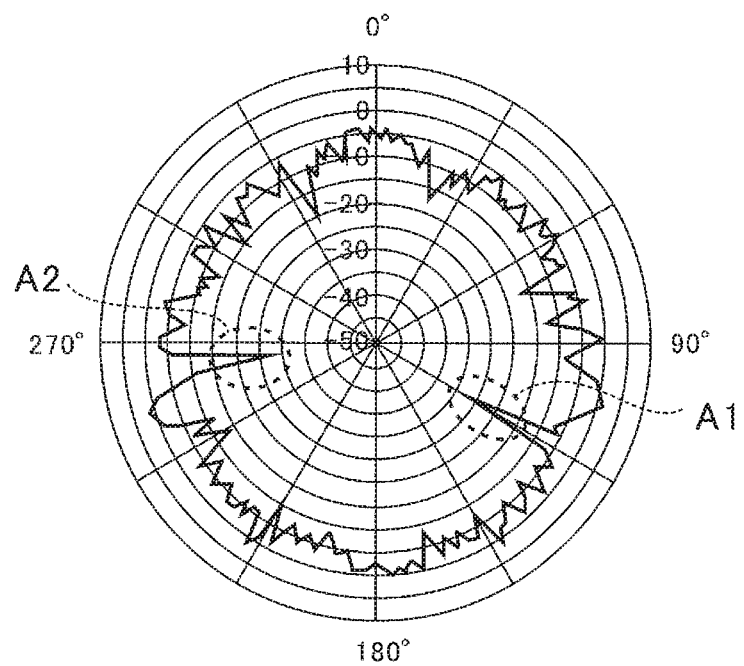
FIG. 4 is a diagram illustrating an example of gain of a radio wave to be emitted from an antenna element.
Figure 5:
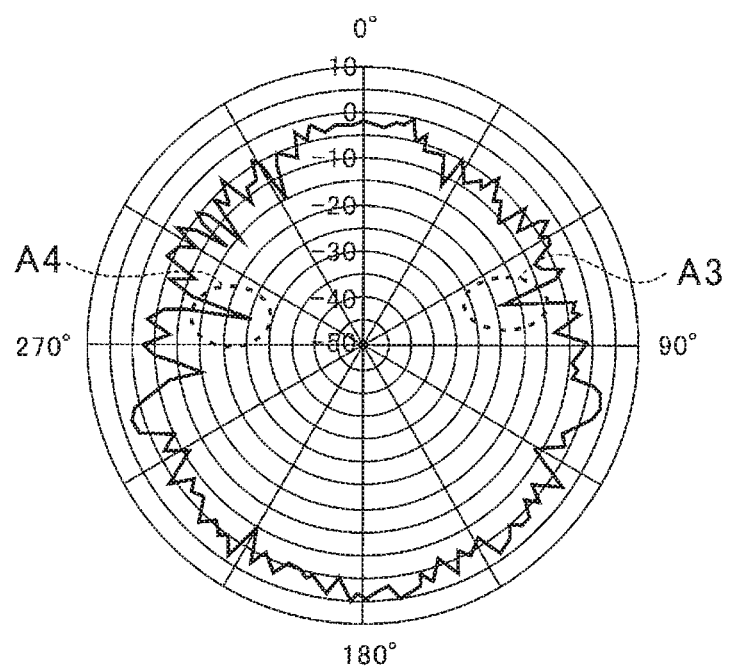
FIG. 5 is a diagram illustrating another example of the gain of the radio wave to be emitted from the antenna element.

FIG. 4 is a diagram illustrating an example of the gain of the radio wave to be emitted from the antenna element 21. FIG. 5 is a diagram illustrating another example of the gain of the radio wave to be emitted from the antenna element 21. FIG. 4 illustrates a case where the antenna element 21 is disposed forward. FIG. 5 illustrates a case where the antenna element 21 is disposed rearward. In FIGS. 4 and 5, the gain of the radio wave is indicated with respect to all azimuths within the horizontal direction, with the vehicle 2 serving as a center. In FIGS. 4 and 5, 0° denotes the front direction; 90° denotes the right direction; 180° denotes the rear direction; and 270° denotes the left direction. Because the gain is obtained by measurement of the electric field strength, FIGS. 4 and 5 also indicate distribution of the electric field strength.

In the example of FIG. 4, the gain decreases considerably in a direction of about 120°, as illustrated in an area A1 surrounded by a broken line. Moreover, in the example of FIG. 4, the gain decreases considerably in a direction of about 260°, as illustrated in an area A2 surrounded by a broken line. In a case where the antenna element 21 is disposed at a forward position, there is high possibility of the interruption of the communication in these directions, i.e., the directions of about 120° and about 260°.

Meanwhile, in the example of FIG. 5, the gain decreases considerably in a direction of about 75°, as illustrated in an area A3 surrounded by a broken line. Moreover, in the example of FIG. 5, the gain decreases considerably in a direction of about 285°, as illustrated in an area A4 surrounded by a broken line. In a case where the antenna element 21 is disposed at a rearward position, there is high possibility of the interruption of the communication in these directions, i.e., the directions of about 75° and about 285°.

As is clear from comparison between FIGS. 4 and 5, the directions of the decrease in the gain in the antenna element 21 disposed forward (refer to FIG. 4) and the directions of the decrease in the gain in the antenna element 21 disposed rearward (refer to FIG. 5) are different. In other words, the directions of an interruption of communication via the antenna element 21 disposed forward and the directions of an interruption of communication via the antenna element 21 disposed rearward are different. In this way, the azimuth of the decrease in the gain, i.e., the azimuth having high possibility of the interruption of the communication, is varied with movement of the position of the antenna element 21.

For example, in performing communication with a vehicle located in a direction of 120°, forward movement of the antenna element 21 is highly likely to cause an interruption of the communication. Thereafter, however, rearward movement of the antenna element 21 eliminates the decrease in the gain in the direction of 120°. This makes it possible to restore the communication with the vehicle located in the direction of 120°.

In case of an interruption of communication via the antenna element 21, the controller 40 may drive the moving part 22, causing the antenna element 21 to move to a position that brings about restoration of communication.

Figure 6:
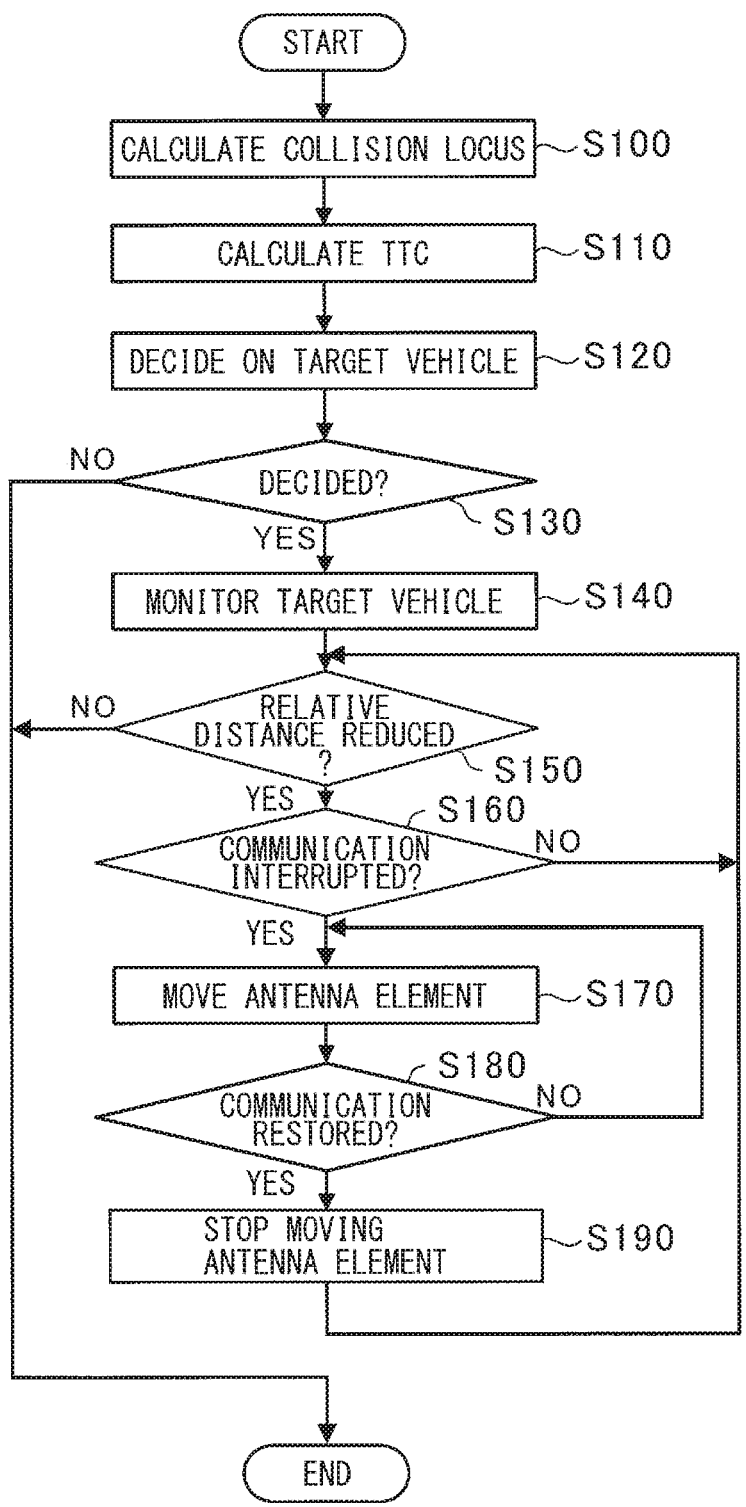
FIG. 6 is a flowchart illustrating processing to be performed by a controller.

FIG. 6 is a flowchart illustrating processing to be performed by the controller 40. First, the controller 40 may calculate a collision locus for each of the surrounding vehicles around an own vehicle (S100).

In one specific but non-limiting example, the controller 40 may acquire the speed information, the steering angle information, and the positional information of the vehicle 2 respectively from the speed sensor 4, the steering angle sensor 5, and the GNSS receiver 6. In the following, the vehicle 2 is also referred to as the own vehicle. The controller 40 may calculate the traveling direction of the own vehicle from the steering angle information. The controller 40 may calculate acceleration from a temporal change of the vehicle speed of the own vehicle indicated by the speed information. The controller 40 may calculate a past movement locus and a future movement locus of the own vehicle, on the basis of traveling direction information and on the basis of acceleration information. The traveling direction information may indicate the traveling direction. The acceleration information may indicate the acceleration. The future movement locus may be calculated on an assumption that, for example, the own vehicle travels from a current position along the traveling direction at the vehicle speed and the acceleration calculated.

Meanwhile, the communicator 30 may perform inter-vehicle communication to acquire pieces of information that indicate traveling states of the surrounding vehicles. Non-limiting examples of the information to be acquired by the inter-vehicle communication may include speed information, traveling direction information, positional information, acceleration information, information indicating a past movement locus, information indicating a future movement locus, and identification information for vehicle identification, regarding each of the surrounding vehicles. The communicator 30 may acquire these pieces of information from each of the surrounding vehicles around the own vehicle with which the communication is available. These pieces of information may be transmitted to the controller 40. The controller 40 may convert the future movement locus of each of the surrounding vehicles thus acquired, into a movement locus with the own vehicle serving as a reference. The future movement locus of each of the surrounding vehicles and the future movement locus of the own vehicle indicate a collision locus. It is to be noted that the communicator 30 may acquire the speed information and the positional information from each of the surrounding vehicles, and the controller 40 may calculate the future movement locus of each of the surrounding vehicles from the speed information and the positional information thus acquired.

The controller 40 may calculate an intersection of the future movement locus of each of the surrounding vehicles and the future movement locus of the own vehicle. The controller 40 may carry out the calculation of the intersection for each of the surrounding vehicles the identification information of which has been obtained. If any intersection has been calculated, a determination may be made that a collision point has broken out, for the relevant one of the surrounding vehicles. The collision point means a point at which the own vehicle may possibly collide with the relevant one of the surrounding vehicles. If no intersection has been calculated, a determination may be made that no collision point has broken out, for the relevant one of the surrounding vehicles.

Thereafter, the controller 40 may calculate time to collision (TTC), for each of the surrounding vehicles with which the collision point has broken out (step S110). The TTC means time it would take to reach the collision point. For example, the TTC means time it would take for the own vehicle to reach the collision point if the own vehicle moved over a distance from the current position to the collision point at the current vehicle speed.

Thereafter, the controller 40 may decide on one of the surrounding vehicles having shortest TTC, as a target vehicle, out of the surrounding vehicles for each of which the TTC has been calculated (step S120). This is because the surrounding vehicle having the shortest TTC is considered to be in a most critical condition. For example, the controller 40 may impart a flag indicating the target vehicle, to the identification information of the surrounding vehicle having the shortest TTC. In a case where the controller 40 has failed in finding the surrounding vehicle having the shortest TTC, the controller 40 may refrain from deciding on the target vehicle. In a case where the controller 40 has refrained from deciding on the target vehicle (NO in step S130), the controller 40 may end the series of processing.

In a case where the controller 40 has decided on the target vehicle (YES in step S130), the controller 40 may monitor movement of the target vehicle decided (step S140). For example, the controller 40 may monitor the movement of the target vehicle, from transitions of the positional information and/or the speed information of the target vehicle obtained by the inter-vehicle communication. In one alternative, the controller 40 may monitor the movement of the target vehicle, from transitions of magnitude and/or a direction of electric field strength of a radio wave transmitted from the target vehicle.

Thereafter, the controller 40 may determine whether or not a relative distance from the own vehicle to the target vehicle has been reduced with lapse of time (step S150). In a case where the relative distance has not been reduced (NO in step S150), the controller 40 may end the series of processing. In a case where the relative distance has been reduced (YES in step S150), the controller 40 may determine whether or not the interruption of the communication with the target vehicle has occurred (step S160). In a case with no interruption of the communication with the target vehicle (NO in step S160), the controller 40 may return to processing of step S150.

In a case where the interruption of the communication with the target vehicle has occurred (YES in step S160), the controller 40 may drive the moving part 22, causing the antenna element 21 to move (step S170). For example, the controller 40 may move the antenna element 21 by a predetermined distance set in advance. The predetermined distance may be decided, for example, within a range of a distance from the most forward position to the most rearward position. In other words, the controller 40 may allow the antenna element 21 to move, upon the interruption of the communication with the target vehicle, on the condition that the relative distance from the own vehicle to the target vehicle is reduced.

After moving the antenna element 21, the controller 40 may determine whether or not the communication has been restored (step S180). In a case where the communication has not been restored (NO in step S180), the controller 40 may return to processing of step S170, in which the controller 40 may move the antenna element 21. Meanwhile, in a case where the communication has been restored (YES in step S180), the controller 40 may stop moving the antenna element 21 (step S190), to return to the processing of step S150. In other words, the controller 40 may move the antenna element 21 until the restoration of communication. In this way, the controller 40 may repeat the processing of steps S150 to S190 until the target vehicle travels away from the own vehicle.

Figure 7:
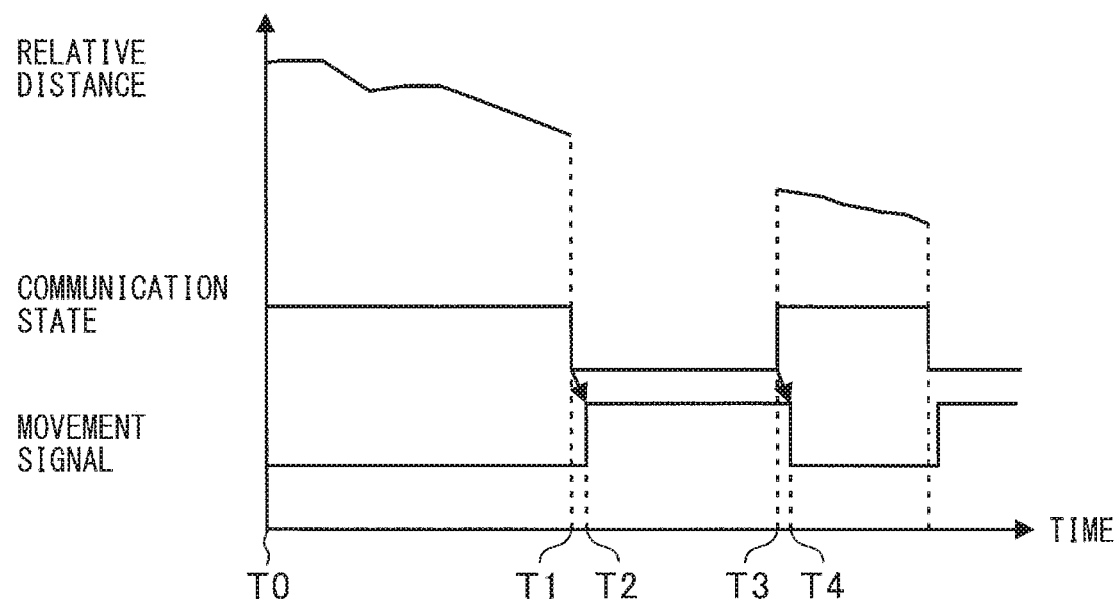
FIG. 7 is a descriptive diagram illustrating relation of a relative distance from an own vehicle to a target vehicle, a communication state with the target vehicle, and a movement signal that causes the antenna element to move.

FIG. 7 is a descriptive diagram illustrating relation of the relative distance from the own vehicle to the target vehicle, a communication state with the target vehicle, and a movement signal that causes the antenna element 21 to move. During a period from time T0 to time T1, the relative distance from the own vehicle to the target vehicle is gradually reduced. Moreover, during the period from time T0 to time T1, the communication state of the own vehicle with the target vehicle is optimal. In FIG. 7, the optimal communication state is denoted by a signal of a high level. Furthermore, during the period from time T0 to time T1, the controller 40 may refrain from transmitting the movement signal to the moving part 22. In FIG. 7, refraining from transmitting the movement signal is denoted by the movement signal of a low level. In other words, during the period from time T0 to time T1, the antenna element 21 is maintained at a predetermined position, e.g., at the most forward position. It follows that during the period from time T0 to time T1, the processing of steps S150 to S190 in FIG. 6 is repeated.

Assume that at time T1, the communication with the target vehicle is interrupted. In FIG. 7, the interruption of the communication is denoted by a signal of a low level. The controller 40, having determined that the communication has been interrupted, may transmit the movement signal to the moving part 22 at time T2 immediately after time T1. In FIG. 7, the transmission of the movement signal is denoted by the movement signal of a high level. The controller 40 may transmit the movement signal, for example, for preset time. This causes the antenna element 21 to move by a distance corresponding to the time for which the movement signal is being transmitted. The antenna element 21 may move, for example, rearward from the most forward position.

The controller 40 may repeat the transmission of the movement signal (i.e., step S170 in FIG. 6) and confirmation of the restoration of communication (i.e., step S180 in FIG. 6). As the position of the antenna element 21 moves, the direction of the decrease in the gain of the radio wave moves. Thus, the decrease in the gain of the radio wave in the azimuth in which the target vehicle is located is eliminated. In this way, the communication with the target vehicle is restored.

Assume that the communication is restored at time T3. The controller 40, having determined that the communication has been restored, may stop transmitting the movement signal, at time T4 immediately after time T3. This causes a stop of the movement of the antenna element 21. In other words, the antenna element 21 is maintained at a position where optimal communication is carried out.

Moreover, during a period from time T1 to time T3, the communication with the target vehicle is interrupted. Accordingly, during the period from time T1 to time T3, there is no way to acquire the positional information of the target vehicle, with the relative distance from the own vehicle to the target vehicle remaining unknown. However, upon the restoration of the communication at time T3, it becomes possible again to acquire the positional information of the target vehicle. Thus, at and after time T3, it is possible again to know the relative distance from the own vehicle to the target vehicle.

Furthermore, the information of the inter-vehicle communication may include the identification information of each of the surrounding vehicles. Upon the restoration of the communication, the controller 40 may check the identification information of each of the surrounding vehicles with the identification information of the target vehicle. The controller 40 may assume that one of the surrounding vehicles the identification information of which coincides with that of the target vehicle is the target vehicle. Thus, the communication with the target vehicle before the interruption of the communication is established.

Moreover, at and after time T4, the processing of steps S150 to S190 may be repeated until the target vehicle travels away from the own vehicle. At and after time T4, upon the interruption of the communication with the target vehicle, the controller 40 may move again the antenna element 21 to a position that brings about the restoration of communication.

In the antenna device 1, there may occur instantaneous radio wave interference caused by the roof rails 10, which is followed by generation of the azimuth of the decrease in the gain of the radio wave. If a location of the target vehicle is covered in the azimuth of the decrease in the gain of the radio wave, the communication with the target vehicle is interrupted. However, upon the interruption of the communication with the target vehicle, the antenna device 1 may move the antenna element 21 to the position that brings about the restoration of communication. This makes it possible for the antenna device 1 to restore the communication with the target vehicle, even if positional relation of the own vehicle to the target vehicle is unchanged. Hence, in the antenna device 1, it is possible to suppress the radio wave interference caused by the roof rails 10, allowing for the omnidirectional communication.

Moreover, the antenna device 1 may move the antenna element 21, to restore the communication. Hence, it is possible to shorten time during which the communication is interrupted.

Furthermore, the antenna device 1 decides on one of the surrounding vehicles having the shortest TTC, as the target vehicle, to restore the communication with the target vehicle. Hence, in the antenna device 1, it is possible to communicate with the surrounding vehicle in the most critical condition, making it possible to offer an enhanced level of safety.

The controller 40 may change the azimuth of the decrease in the gain of the radio wave, by the movement of the antenna element 21. Therefore, in one implementation, the controller 40 may serve as a "radio wave characteristic switching controller" that changes a characteristic of a radio wave to be transmitted and received by the antenna element 21, until the restoration of communication.

It is to be noted that it suffices for the moving part 22 to be able to move the antenna element 21. The moving part 22 is not limited to a configuration including the belt 24.

Moreover, the moving part 22 is not limited to a mode in which the antenna element 21 is made to move in the front-rear direction of the vehicle 2. For example, the moving part 22 may move the antenna element 21 in a right-left direction of the vehicle 2.

(Second Implementation)

Figure 8:
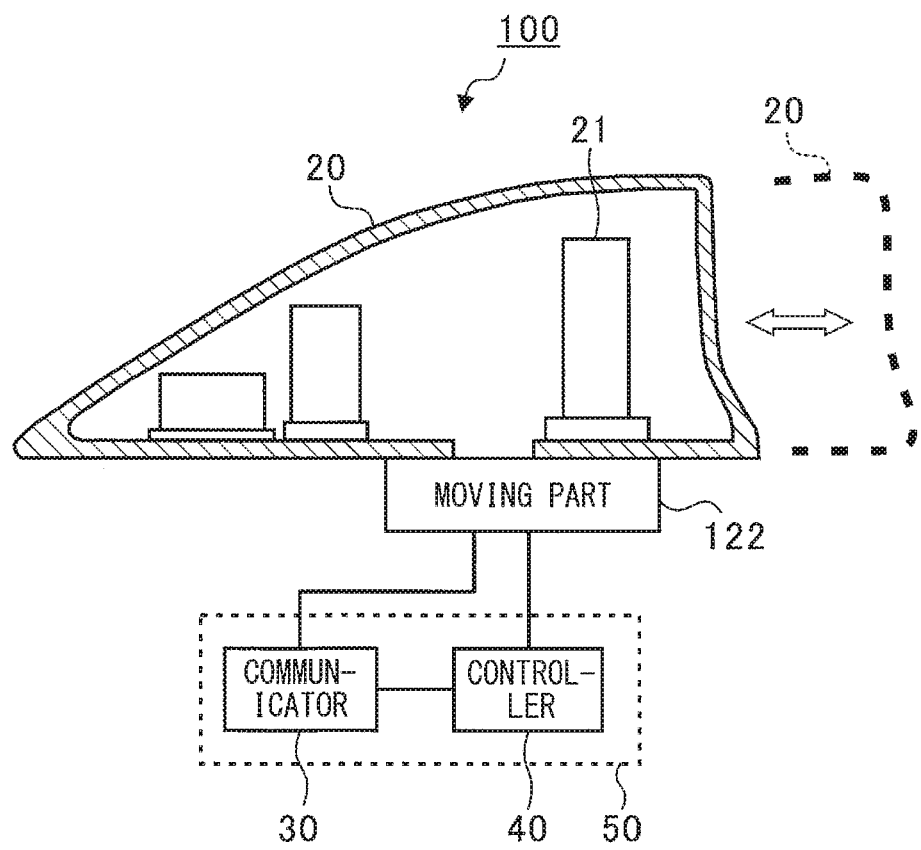
FIG. 8 schematically illustrates a configuration of an antenna device according to a second implementation.

FIG. 8 is a schematic diagram illustrating a configuration of an antenna device 100 according to a second implementation. The antenna device 100 is different from the antenna device 1 of the first implementation in that the antenna device 100 includes a moving part 122 instead of the moving part 22.

The moving part 122 may be coupled to a surface on outer side in the bottom of the main body 20. The moving part 122 may be provided on the roof 3. The moving part 122 may move the main body 20 along the plane parallel to the roof 3. The moving part 122 may have, for example, a similar configuration to that of the moving part 22 of the first implementation. In the antenna device 100, at least a portion of the bottom of the main body 20 may be fixed to the belt 24 of the moving part 122. Moreover, the antenna element 21 may be fixed to a surface on inner side in the bottom of the main body 20.

The controller 40 may calculate the TTC from the future movement locus of each of the surrounding vehicles and the future movement locus of the own vehicle. The controller 40 may decide on one of the surrounding vehicles having the shortest TTC, as the target vehicle. In case of the interruption of the communication with the target vehicle via the antenna element 21, the controller 40 may move the moving part 122, causing the main body 20 to move to a position that brings about the restoration of communication. In FIG. 8, a portion of the main body 20 after rearward movement is denoted by a broken line. The movement of the main body 20 results in the movement of the antenna element 21. The movement of the antenna element 21 causes a change in the azimuth of the decrease in the gain of the radio wave, leading to elimination of the decrease in the gain of the radio wave in the azimuth in which the target vehicle is located. Thus, the communication with the target vehicle is restored.

The antenna device 100 is able to restore the communication with the target vehicle, even if the positional relation of the own vehicle to the target vehicle is unchanged. Hence, in the antenna device 100, it is possible to suppress the radio wave interference caused by the roof rails 10, allowing for the omnidirectional communication.

Moreover, in the antenna device 100, it is possible to shorten the time during which the communication is interrupted.

Furthermore, in the antenna device 100, it is possible to communicate with the surrounding vehicle in the most critical condition, making it possible to offer the enhanced level of safety.

In one implementation, the controller 40 may serve as the "radio wave characteristic switching controller" that changes, in case of the interruption of the communication via the antenna element 21, the characteristic of the radio wave to be transmitted and received by the antenna element 21, until the restoration of communication.

It is to be noted that the moving part 122 is not limited to a mode in which the main body 20 is made to move in the front-rear direction of the vehicle 2. For example, the moving part 122 may move the main body 20 in the right-left direction of the vehicle 2.

(Third Implementation)

Figure 9:
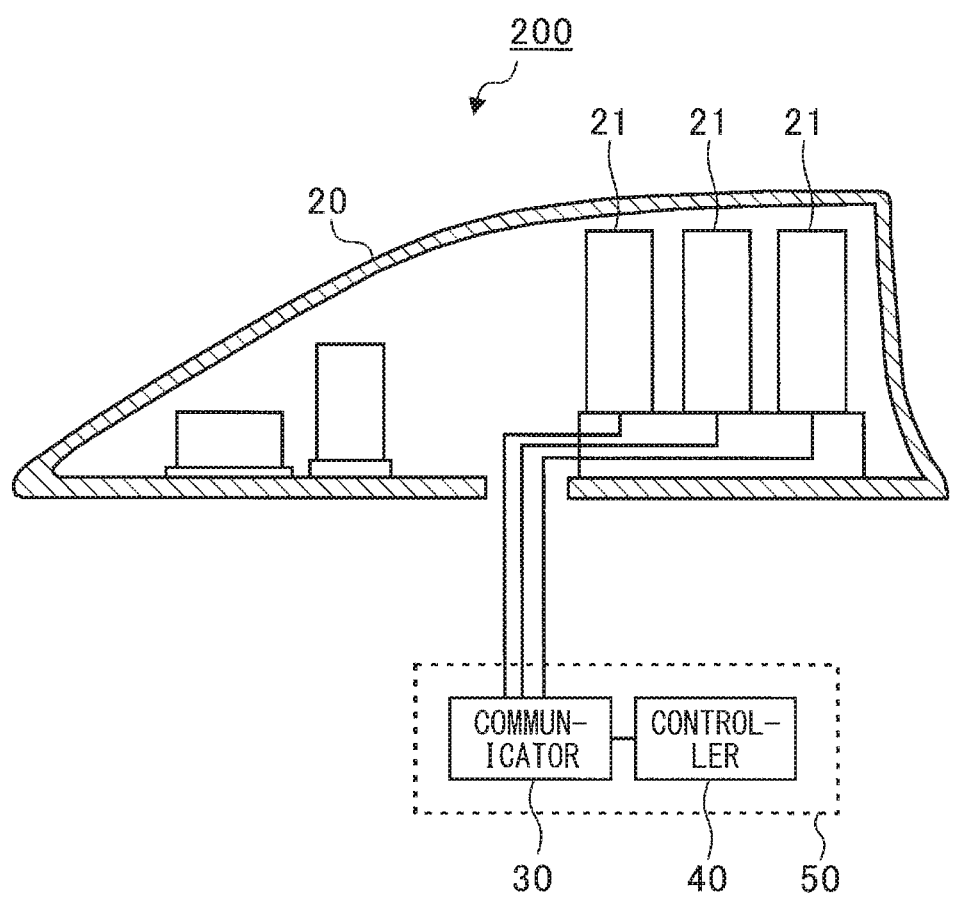
FIG. 9 schematically illustrates a configuration of an antenna device according to a third implementation.

FIG. 9 is a schematic diagram illustrating a configuration of an antenna device 200 according to a third implementation. The antenna device 200 is different from the antenna device 1 of the first implementation in that the antenna element 21 includes a plurality of antenna elements 21, and that the moving part 22 is eliminated.

The plurality of the antenna elements 21 may be fixed to the surface in the inner side in the bottom of the main body 20. The plurality of the antenna elements 21 may be disposed along the plane parallel to the roof 3. In one specific but non-limiting example, the plurality of the antenna elements 21 may be arranged in the front-rear direction of the vehicle 2. In the example of FIG. 9, the three antenna elements 21 may be arranged at equally spaced intervals in the front-rear direction of the vehicle 2.

The controller 40 may appoint one of the plurality of the antenna elements 21 to perform communication. The controller 40 may calculate the TTC from the future movement locus of each of the surrounding vehicles and the future movement locus of the own vehicle. The controller 40 may decide on one of the surrounding vehicles having the shortest TTC, as the target vehicle. In case of the interruption of the communication with the target vehicle, the controller 40 may transfer an appointment to perform communication, to remainder of the plurality of the antenna elements 21.

For example, upon the interruption of the communication via the appointed one of the antenna elements 21, the controller 40 may transfer the appointment to perform communication, to the next antenna element 21. Thereafter, the controller 40 may determine whether or not the communication has been restored. In the case where the communication has not been restored, the controller 40 may transfer the appointment to perform communication, to the next antenna element 21 but one. Thus, the controller 40 may repetitively transfer the appointment until the restoration of communication. The controller 40 may transfer the appointment rearward from front, or alternatively, the controller 40 may transfer the appointment forward from rear. Furthermore, the controller 40 may transfer the appointment one by one as described above, or alternatively, the controller 40 may transfer the appointment to the two or more antenna elements 21 at once.

In the antenna device 200, the appointment to perform communication may be transferred among the antenna elements 21. Accordingly, in the antenna device 200, the same action is produced as in the case where the antenna element 21 moves. In other words, in the antenna device 200, as with the first implementation, the azimuth of the decrease in the gain of the radio wave is varied, leading to elimination of the decrease in the gain of the radio wave in the azimuth in which the target vehicle is located. The antenna device 200 is, therefore, able to restore the communication with the target vehicle, even if the positional relation of the own vehicle to the target vehicle is unchanged. Hence, in the antenna device 200, it is possible to suppress the radio wave interference caused by the roof rails 10, allowing for the omnidirectional communication.

Moreover, in the antenna device 200, it is possible to shorten the time during which the communication is interrupted.

Furthermore, in the antenna device 200, it is possible to communicate with the surrounding vehicle in the most critical condition, making it possible to offer the enhanced level of safety.

In one implementation, the controller 40 may serve as the "radio wave characteristic switching controller" that switches, in case of the interruption of the communication via the antenna element 21, the characteristic of the radio wave to be transmitted and received by the antenna element 21, until the restoration of communication. Moreover, in one implementation, the controller 40 may serve as the "radio wave characteristic switching controller" that appoints one of the antenna elements 21 to perform communication, and in case of the interruption of communication via the appointed one of the antenna elements 21, transfers the appointment to perform communication to the remainder of the antenna elements 21, until the restoration of communication.

It is to be noted that the number of the antenna elements 21 is not limited to three.

Moreover, a direction of arrangement of the plurality of the antenna elements 21 is not limited to the front-rear direction of the vehicle 2. For example, the plurality of the antenna elements 21 may be arranged in the right-left direction of the vehicle 2.

Furthermore, there is no limitation on which one of the remainder of the antenna elements 21 to transfer the appointment to. The controller 40 does not have to transfer the appointment to the next antenna element 21 to the previous one. For example, the controller 40 may transfer the appointment to perform communication randomly among the antenna elements 21.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In the example implementations, the communicator 30 and the controller 40 may constitute the inter-vehicle communication unit 50. However, the communicator 30 and the controller 40 may be provided separately from the inter-vehicle communication unit 50.

Furthermore, the processing to be performed by the controller 40 may be shared by a plurality of units. For example, the controller 40 may be constituted by the inter-vehicle communication unit 50 and an engine control unit (ECU). The ECU may perform the calculation of the collision locus and the calculation of the TTC. The inter-vehicle communication unit 50 may perform the determination as to whether or not the communication has been interrupted.

In the example implementations, upon the interruption of the communication, the controller 40 may change the characteristic of the radio wave, i.e., the azimuth of the decrease in the gain of the radio wave, until the restoration of communication. However, the controller 40 may change other characteristics of the radio wave. For example, the controller 40 may change directivity of the radio wave. In another alternative, the controller 40 may change an output of the radio wave.

The controller 40 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 40 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 40 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:
1. An antenna device comprising:
an antenna element fitted on a vehicle, the antenna element being configured to transmit and receive a radio wave;
a radio wave characteristic switching controller configured to change, in case of an interruption of communication via the antenna element, a characteristic of the radio wave to be transmitted and received by the antenna element, until restoration of communication; and a moving part configured to move the antenna element along a plane parallel to a roof of the vehicle, wherein upon the interruption of the communication via the antenna element, the radio wave characteristic switching controller drives the moving part, causing the antenna element to move to a position that brings about the restoration of communication.

2. The antenna device according to claim 1, wherein the radio wave characteristic switching controller calculates time to collision, on a basis of a future movement locus of each of surrounding vehicles and a future movement locus of an own vehicle, decides on one of the surrounding vehicles having shortest time to collision, as a target vehicle, and in case of an interruption of communication with the target vehicle, drives the moving part, causing the antenna element to move to the position that brings about the restoration of communication.

3. The antenna device according to claim 1, wherein the vehicle includes a rooftop structure.

4. The antenna device according to claim 2, wherein the vehicle includes a rooftop structure.

5. An antenna device comprising:

an antenna element fitted on a vehicle, the antenna element being configured to transmit and receive a radio wave;

a radio wave characteristic switching controller configured to change, in case of an interruption of communication via the antenna element, a characteristic of the radio wave to be transmitted and received by the antenna element, until restoration of communication;

a main body that accommodates the antenna element; and a moving part configured to move the main body along a plane parallel to a roof of the vehicle, wherein upon the interruption of the communication via the antenna element, the radio wave characteristic switching controller drives the moving part, causing the main body to move to a position that brings about the restoration of communication.

6. The antenna device according to claim 5, wherein the radio wave characteristic switching controller calculates time to collision, on a basis of a future movement locus of each of surrounding vehicles and a future movement locus of an own vehicle, decides on one of the surrounding vehicles having shortest time to collision, as a target vehicle, and in case of an interruption of communication with the target vehicle, drives the moving part, causing the main body to move to the position that brings about the restoration of communication.

7. The antenna device according to claim 5, wherein the vehicle includes a rooftop structure.

8. The antenna device according to claim 6, wherein the vehicle includes a rooftop structure.

9. An antenna device comprising:

an antenna element fitted on a vehicle, the antenna element being configured to transmit and receive a radio wave; and circuitry configured change, in case of an interruption of communication via the antenna element, a characteristic of the radio wave to be transmitted and received by the antenna element, until restoration of communication, wherein the antenna element includes a plurality of antenna elements disposed along a plane parallel to a roof of the vehicle, and the circuitry appoints one of the plurality of the antenna elements to perform communication, and in case of an interruption of communication via the appointed one of the plurality of the antenna elements, transfers an appointment to perform communication to remainder of the plurality of the antenna elements.

10. The antenna device according to claim 9, wherein the radio wave characteristic switching controller calculates time to collision, on a basis of a future movement locus of each of surrounding vehicles and a future movement locus of an own vehicle, decides on one of the surrounding vehicles having shortest time to collision, as a target vehicle, and in case of an interruption of communication with the target vehicle, transfers the appointment to the remainder of the plurality of the antenna elements.

11. The antenna device according to claim 9, wherein the vehicle includes a rooftop structure.

12. The antenna device according to claim 10, wherein the vehicle includes a rooftop structure.

* * * * *